(12) United States Patent
Schwarz et al.

(10) Patent No.: US 10,036,316 B2
(45) Date of Patent: Jul. 31, 2018

(54) GEARED TURBOFAN ENGINE WITH HIGH COMPRESSOR EXIT TEMPERATURE

(71) Applicant: UNITED TECHNOLOGIES CORPORATION, Hartford, CT (US)

(72) Inventors: Frederick M. Schwarz, Glastonbury, CT (US); Karl L. Hasel, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 513 days.

(21) Appl. No.: 14/663,727

(22) Filed: Mar. 20, 2015

(65) Prior Publication Data

US 2015/0345427 A1 Dec. 3, 2015

Related U.S. Application Data

(63) Continuation-in-part of application No. 14/354,175, filed as application No. PCT/US2013/030407 on Mar. 12, 2013.

(Continued)

(51) Int. Cl.
*F02K 3/06* (2006.01)
*F02C 3/13* (2006.01)
(Continued)

(52) U.S. Cl.
CPC .............. *F02C 3/13* (2013.01); *F02C 3/06* (2013.01); *F02C 3/10* (2013.01); *F02C 7/36* (2013.01);
(Continued)

(58) Field of Classification Search
CPC ...... F02K 3/06; F02C 3/13; F02C 7/36; F05D 2220/36; F05D 2220/327; F05D 2260/40311
See application file for complete search history.

(56) References Cited

U.S. PATENT DOCUMENTS 3,287,906 A 11/1966 McCormick
3,673,802 A * 7/1972 Krebs et al. ............... 60/226.1
(Continued)

FOREIGN PATENT DOCUMENTS

GB 1516041 6/1978
GB 2041090 9/1980
WO 2007038674 4/2007

OTHER PUBLICATIONS

Earl Logan, Jr. et al., Handbook of Turbomachinery, 2nd Edition, 2003 by Marcel Dekker Inc., p. 113.*
(Continued)

*Primary Examiner* — William H Rodriguez
(74) *Attorney, Agent, or Firm* — Carlson, Gaskey & Olds, P.C.

(57) ABSTRACT

A gas turbine engine includes a fan with a plurality of fan blades rotatable about an axis, and a compressor section that includes at least first and second compressor sections. An average exit temperature of the compressor section is between about 1000° F. and about 1500° F. The engine also includes a combustor that is in fluid communication with the compressor section, and a turbine section that is in fluid communication with the combustor. A geared architecture is driven by the turbine section for rotating the fan about the axis.

15 Claims, 6 Drawing Sheets

Related U.S. Application Data

(60) Provisional application No. 61/708,692, filed on Oct. 2, 2012.

(51) Int. Cl.
*F02C 7/36* (2006.01)
*F02C 3/06* (2006.01)
*F02C 3/10* (2006.01)

(52) U.S. Cl.
CPC ............ *F02K 3/06* (2013.01); *F05D 2220/36* (2013.01); *F05D 2240/24* (2013.01); *F05D 2240/30* (2013.01); *F05D 2240/35* (2013.01); *F05D 2240/55* (2013.01); *F05D 2250/283* (2013.01); *F05D 2260/40311* (2013.01); *Y02T 50/671* (2013.01)

(56) References Cited

U.S. PATENT DOCUMENTS

| | | | | |
|---|---|---|---|---|
| 3,886,737 | A * | 6/1975 | Grieb | F02K 3/077 181/220 |
| 4,055,946 | A | 11/1977 | Sens | |
| 4,085,583 | A * | 4/1978 | Klees | F02K 3/075 60/204 |
| 4,827,712 | A * | 5/1989 | Coplin | 60/226.1 |
| 5,010,729 | A * | 4/1991 | Adamson | F02C 3/067 416/129 |
| 5,201,845 | A * | 4/1993 | Allmon et al. | 415/169.1 |
| 5,274,999 | A * | 1/1994 | Rohra et al. | 60/226.1 |
| 5,915,917 | A | 6/1999 | Eveker et al. | |
| 6,082,967 | A * | 7/2000 | Loisy | 416/129 |
| 6,267,553 | B1 | 7/2001 | Burge | |
| 6,375,421 | B1 * | 4/2002 | Lammas et al. | 415/199.5 |
| 6,630,244 | B1 * | 10/2003 | Mao | C07C 43/17 428/447 |
| 2002/0134070 | A1 * | 9/2002 | Orlando | F01D 9/041 60/204 |
| 2005/0111964 | A1 | 5/2005 | Krammer et al. | |
| 2008/0022653 | A1 * | 1/2008 | Schilling | F02C 7/36 60/226.1 |
| 2008/0098713 | A1 * | 5/2008 | Orlando | F01D 15/12 60/226.1 |
| 2009/0053058 | A1 | 2/2009 | Kohlenberg et al. | |
| 2009/0148276 | A1 | 6/2009 | Suciu et al. | |
| 2010/0005778 | A1 * | 1/2010 | Chaudhry | 60/226.3 |
| 2010/0148396 | A1 | 6/2010 | Xie et al. | |
| 2010/0303616 | A1 * | 12/2010 | Chir | F02C 6/08 415/178 |
| 2010/0331139 | A1 | 12/2010 | McCune | |
| 2011/0167790 | A1 * | 7/2011 | Cloft et al. | 60/226.2 |
| 2011/0286836 | A1 * | 11/2011 | Davis | 415/170.1 |
| 2011/0302907 | A1 * | 12/2011 | Murphy | 60/226.3 |
| 2012/0067055 | A1 * | 3/2012 | Held | F02C 7/12 60/772 |
| 2012/0073263 | A1 | 3/2012 | Kohlenberg | |
| 2012/0117940 | A1 * | 5/2012 | Winter | 60/226.3 |
| 2012/0237335 | A1 | 9/2012 | McCune et al. | |
| 2012/0251306 | A1 * | 10/2012 | Reinhardt et al. | 415/182.1 |
| 2012/0257960 | A1 * | 10/2012 | Reinhardt et al. | 415/122.1 |
| 2013/0098055 | A1 * | 4/2013 | Kupratis | F02C 7/143 60/774 |
| 2013/0104560 | A1 * | 5/2013 | Kupratis | 60/772 |
| 2013/0219913 | A1 * | 8/2013 | McCune et al. | 60/779 |
| 2013/0223986 | A1 * | 8/2013 | Kupratis et al. | 415/115 |
| 2013/0224003 | A1 * | 8/2013 | Kupratis et al. | 415/185 |
| 2013/0259651 | A1 * | 10/2013 | Kupratis | F02C 3/113 415/122.1 |
| 2013/0259652 | A1 * | 10/2013 | Kupratis | F02C 7/36 415/122.1 |
| 2013/0259654 | A1 * | 10/2013 | Kupratis et al. | 415/122.1 |
| 2013/0287575 | A1 * | 10/2013 | McCune et al. | 416/170 R |
| 2013/0327060 | A1 * | 12/2013 | Christians | 60/805 |
| 2014/0260326 | A1 * | 9/2014 | Schwarz et al. | 60/805 |
| 2014/0271135 | A1 * | 9/2014 | Sheridan et al. | 415/122.1 |
| 2015/0027101 | A1 * | 1/2015 | Hasel | 60/226.1 |

OTHER PUBLICATIONS

Hall, C.A. and Crichton, D., "Engine Design Studies for a Silent Aircraft", Journal of Turbomachinery, vol. 129, Jul. 2007, p. 482.*

Jane's Aero-Engines, Issue Seven, Edited by Bill Gunston, Jane's Information Group Inc., Alexandria, Virginia, 2000; pp. 1-52.*

Boggia, S. and Rud, K., "Intercooled Recuperated Gas Turbine Engine Concept", AIAA 2005-4192, 41st AIAA/ASME/SAE/ASEE Joint Propulsion Conference & Exhibit, Jul. 10-13, 2005, Tucson, Arizona, pp. 1-11.*

How to save fuel in tomorrow's engine, Flight International, Jul. 30, 1983 pp. 272, 273.*

International Search Report, dated Dec. 12, 2013.

International Preliminary Report on Patentability for International Application No. PCT/US2013/030407 dated Apr. 16, 2015.

Conference on Engineering and Physics: Synergy for Success 2006. Journal of Physics: Conference Series vol. 105. London, UK. Oct. 5, 2006.

Kurzke, J. (2009). Fundamental differences between conventional and geared turbofans. Proceedings of ASME Turbo Expo: Power for Land, Sea, and Air. 2009, Orlando, Florida.

Agarwal, B.D and Broutman, L.J. (1990). Analysis and performance of fiber composites, 2nd Edition. John Wiley & Sons, Inc. New York: New York.

Carney, K., Pereira, M. Revilock, and Matheny, P. Jet engine fan blade containment using two alternate geometries. 4th European LS-DYNA Users Conference.

Brines, G.L. (1990). The turbofan of tomorrow. Mechanical Engineering: The Journal of the American Society of Mechanical Engineers,108(8), 65-67.

Faghri, A. (1995). Heat pipe and science technology. Washington, D.C.: Taylor & Francis.

Hess, C. (1998). Pratt & Whitney develops geared turbofan. Flug Revue 43(7). Oct. 1998.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modern Machine Shop. Retrieved from: http://www.mmsonline.com/articles/composite-fan-blade-containment-case.

Hall, C.A. and Crichton, D. (2007). Engine design studies for a silent aircraft. Journal of Turbomachinery, 129, 479-487.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.

Brennan, P.J. and Kroliczek, E.J. (1979). Heat pipe design handbook. Prepared for National Aeronautics and Space Administration by B & K Engineering, Inc. Jun. 1979.

Horikoshi, S. and Serpone, N. (2013). Introduction to nanoparticles. Microwaves in nanoparticle synthesis. Wiley-VCH Verlag GmbH & Co. KGaA.

Kerrebrock, J.L. (1977). Aircraft engines and gas turbines. Cambridge, MA: The MIT Press.

Xie, M. (2008). Intelligent engine systems: Smart case system. NASA/CR-2008-215233.

Knip, Jr., G. (1987). Analysis of an advanced technology subsonic turbofan incorporating revolutionary materials. NASA Technical Memorandum. May 1987.

Willis, W.S. (1979). Quiet clean short-haul experimental engine (QCSEE) final report NASA/CR-159473.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press.

(56) References Cited

OTHER PUBLICATIONS

Ramsden, J.M. (Ed). (1978). The new European airliner. Flight International, 113(3590). Jan. 7, 1978.

Langston, L. and Faghri, A. Heat pipe turbine vane cooling. Prepared for Advanced Turbine Systems Annual Program Review. Morgantown, West Virginia. Oct. 17-19, 1995.

Oates, G.C. (Ed). (1989). Aircraft propulsion systems and technology and design. Washington, D.C.: American Institute of Aeronautics, Inc.

Lau, K., Gu, C., and Hui, D. (2005). A critical review on nanotube and nanotube/nanoclay related polymer composite materials. Composites: Part B 37(2006) 425-436.

Shorter Oxford English dictionary, 6th Edition. (2007). vol. 2, N-Z. p. 1888.

Lynwander, P. (1983). Gear drive systems: Design and application. New York, New York: Marcel Dekker, Inc.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc.

Pyrograf-III Carbon Nanofiber. Product guide. Retrieved from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc.

Ratna, D. (2009). Handbook of thermoset resins. Shawbury, UK: iSmithers.

Wendus, B.E., Stark, D.F., Holler, R.P., and Funkhouser, M.E. (2003). Follow-on technology requirement study for advanced subsonic transport. NASA/CR-2003-212467.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.

Merriam-Webster's collegiate dictionary, 11th Ed. (2009). p. 824.

Merriam-Webster's collegiate dictionary, 10th Ed. (2001). p. 1125-1126.

Whitaker, R. (1982). ALF502: plugging the turbofan gap. Flight International, p. 237-241, Jan. 30, 1982.

Hughes, C. (2010). Geared turbofan technology. NASA Environmentally Responsible Aviation Project. Green Aviation Summit. NASA Ames Research Center. Sep. 8-9, 2010.

Supplementary European Search Report for European Application No. 13843958.3 dated May 31, 2016.

\* cited by examiner

GTF With High Compressor Exit Temperatures

| Redline Speed | Engine #1 | Engine #2 | Engine #3 |
|---|---|---|---|
| Fan (rpm) | 3280 | 5263 | 3460 |
| LPC (rpm) | 10047 | 12680 | 10600 |
| HPC (rpm) | 22514 | 25160 | 24470 |
| Gear Ratio | 3.0625:1 | 2.409:1 | 3.0625:1 |

FIG.3

GEARED TURBOFAN ENGINE WITH HIGH COMPRESSOR EXIT TEMPERATURE

CROSS-REFERENCE TO RELATED APPLICATION

This is a continuation-in-part of U.S. application Ser. No. 14/354,175, filed Apr. 25, 2014, which is the U.S. national phase of PCT/US2013/030407, filed Mar. 12, 2013, claiming priority to U.S. Provisional Application No. 61/708,692, filed Oct. 2, 2012.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft.

A speed reduction device such as an epicyclical gear assembly may be utilized to drive the fan section such that the fan section may rotate at a speed different than the turbine section so as to increase the overall propulsive efficiency of the engine. In such engine architectures, a shaft driven by one of the turbine sections provides an input to the epicyclical gear assembly that drives the fan section at a reduced speed such that both the turbine section and the fan section can rotate at closer to optimal speeds.

Under certain operational conditions, the compressor section of geared turbofan engines can be subjected to high exit temperatures. Although geared turbofan architectures have provided improved propulsive efficiency at high temperatures, turbine engine manufacturers continue to seek further improvements to engine performance including improvements to thermal, transfer and propulsive efficiencies.

SUMMARY

In a featured embodiment, a gas turbine engine includes a fan with a plurality of fan blades rotatable about an axis, and a compressor section that includes at least first and second compressor sections. An average exit temperature of the compressor section is between about 1000° F. and about 1500° F. The engine also includes a combustor that is in fluid communication with the compressor section, and a turbine section that is in fluid communication with the combustor. A geared architecture is driven by the turbine section for rotating the fan about the axis.

In another embodiment according to the previous embodiment, the average exit temperature is between about 1100° F. and about 1450° F.

In another embodiment according to any of the previous embodiments, the fan drives air along a bypass flow path in a bypass duct defined between a fan nacelle and a core nacelle, and wherein a bypass ratio is greater than about ten.

In another embodiment according to any of the previous embodiments, the geared architecture has a gear ratio that is greater than about 2.4.

In another embodiment according to any of the previous embodiments, the first compressor section comprises a low pressure compressor and the second compressor section comprises a high pressure compressor, and wherein the turbine section comprises a low pressure turbine that drives the low pressure compressor via a first shaft and a high pressure turbine that drives the high pressure compressor via a second shaft, and wherein the geared architecture couples the first shaft to the fan.

In another embodiment according to any of the previous embodiments, the high pressure compressor includes a plurality of stages with each stage comprising a disk with a plurality of blades extending radially outwardly from a rim of the disk, and wherein the plurality of stages includes at least a first stage having a first blade and disk configuration and a second stage having a second blade and disk configuration that is different than the first blade and disk configuration.

In another embodiment according to any of the previous embodiments, the first blade and disk configuration comprises a plurality of slots to receive the plurality of blades and including a plurality of rim cavities for honeycomb seals, and wherein the second blade and disk configuration comprises integrally formed blades such that there are no rim cavities or associated honeycomb seals.

In another embodiment according to any of the previous embodiments, the first stage is positioned forward of the second stage.

In another embodiment according to any of the previous embodiments, an inducer forms an additional compression section positioned in front of the high and low pressure compressors.

In another embodiment according to any of the previous embodiments, the inducer is configured to rotate at a speed common with that of the fan.

In another embodiment according to any of the previous embodiments, the inducer is configured to rotate at a higher speed than the fan through an additional output of the geared architecture.

In another featured example embodiment, a gas turbine engine includes a fan including a plurality of fan blades rotatable about an axis, a compressor section including at least a first compressor section rotating at a first speed and a second compressor section rotating at a second speed greater than the first speed. An average exit temperature of the second compressor section is between about 1000° F. and about 1500° F. A combustor is in fluid communication with the compressor section and a turbine section is in fluid communication with the combustor. A geared architecture is driven by the turbine section for rotating the fan about the axis.

In another embodiment according to any of the previous embodiments, the average exit temperature of the second compressor section is between about 1100° F. and about 1450° F.

In another embodiment according to any of the previous embodiments, the fan drives air along a bypass flow path in a bypass duct defined between a fan nacelle and a core nacelle, and wherein a bypass ratio is greater than about ten.

In another embodiment according to any of the previous embodiments, the geared architecture has a gear ratio that is greater than about 2.4.

In another embodiment according to any of the previous embodiments, the turbine section comprises a first turbine section that drives the first compressor section via a first shaft at the first speed and a second turbine section that drives the second compressor section via a second shaft at the second speed, and wherein the geared architecture couples the first shaft to the fan.

In another embodiment according to any of the previous embodiments, the second compressor section includes a plurality of stages with each stage comprising a disk with a plurality of blades extending radially outwardly from a rim of the disk, and wherein the plurality of stages includes at least a first stage having a first blade and disk configuration and a second stage having a second blade and disk configuration that is different than the first blade and disk configuration.

In another embodiment according to any of the previous embodiments, the first blade and disk configuration comprises a plurality of slots to receive the plurality of blades and including a plurality of rim cavities for honeycomb seals, and wherein the second blade and disk configuration comprises integrally formed blades such that there are no rim cavities or associated honeycomb seals.

In another embodiment according to any of the previous embodiments, the first stage is positioned forward of the second stage.

In another embodiment according to any of the previous embodiments, the operating temperature is defined at Sea Level, end of takeoff power and at a rated thrust for the gas turbine engine.

In another embodiment according to any of the previous embodiments, an intermediate section drives a compressor rotor.

In another embodiment according to any of the previous embodiments, the geared architecture is positioned intermediate the fan and a compressor rotor driven by a low pressure turbine.

In another embodiment according to any of the previous embodiments, the geared architecture is positioned intermediate a low pressure turbine and a compressor rotor driven by the low pressure turbine.

BRIEF DESCRIPTION OF THE DRAWINGS

The disclosure can be further understood by reference to the following detailed description when considered in connection with the accompanying drawings wherein:

FIG. 3 is a chart showing operating conditions for three different engines having high compressor exit temperatures that are operable with the subject invention.

DESCRIPTION

Figure 1:
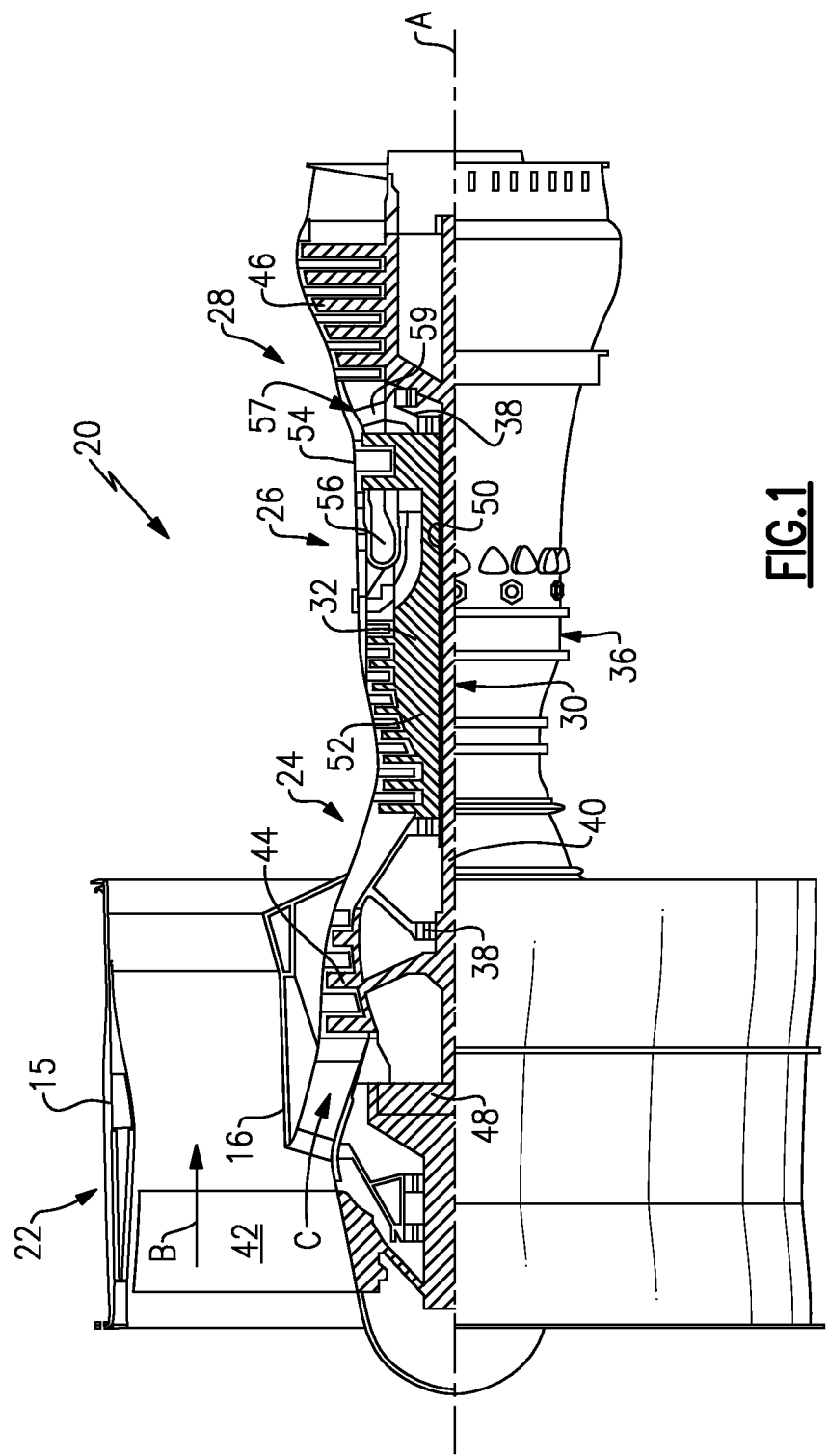
FIG. 1 schematically illustrates a geared turbofan engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined between a fan nacelle 15 and a core nacelle 16, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. A mid-turbine frame 58 of the engine static structure 36 is arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 50 may be varied. For example, gear system 50 may be located aft of combustor section 26 or even aft of turbine section 28, and fan section 22 may be positioned forward or aft of the location of geared architecture 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades in the fan section 22 disclose an example gas turbine engine 20 with increased power transfer efficiency.

Figure 2:
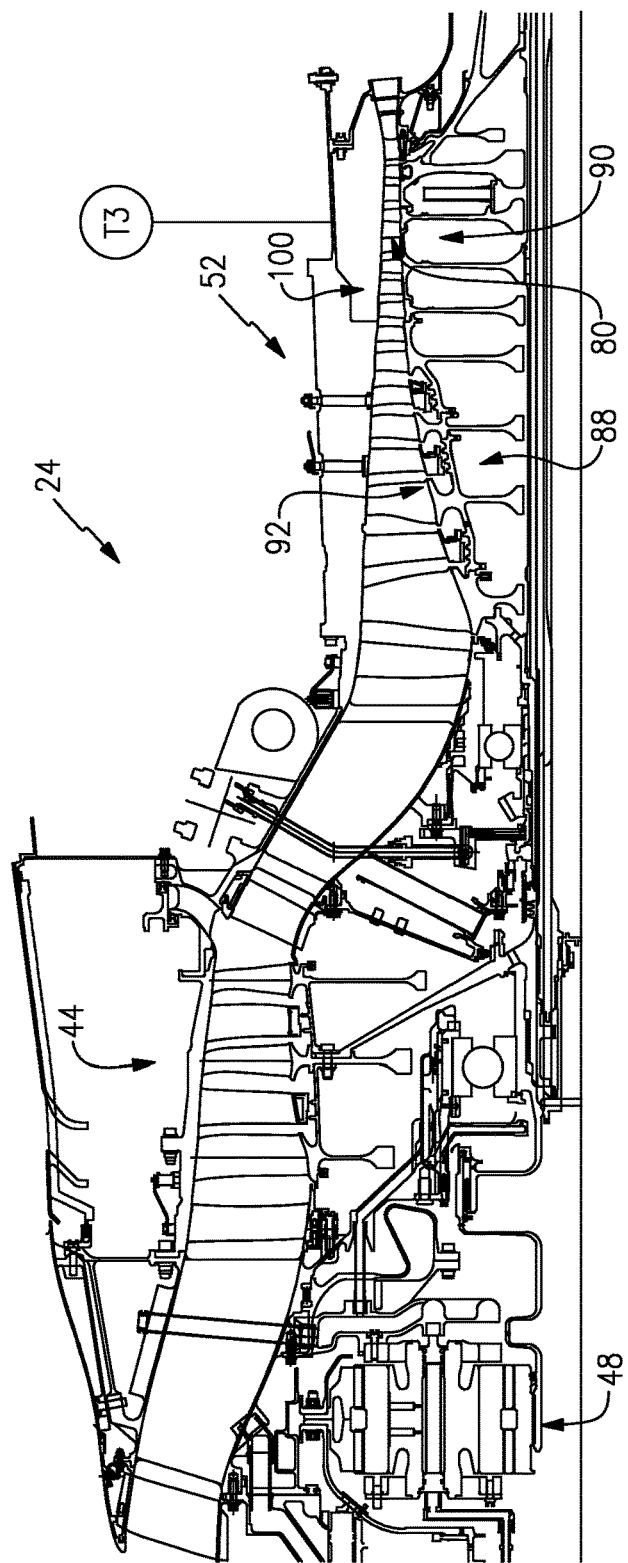
FIG. 2 illustrates a compressor section of the engine of FIG. 1.

Referring to FIG. 2 with continued reference to FIG. 1, the disclosed geared turbofan engine 20 includes a compressor section 24 that has rotors and at least two sections rotating at two different speeds. In the disclosed example, one of the compressor sections is the high pressure compressor 52 and one is a low pressure compressor 44. The example high pressure compressor 52 operates at an average exit temperature referred to in this disclosure as T3. The example high pressure compressor 52 operates at a very high T3. In this example the T3 is determined at Sea Level, end of takeoff power and at the rated thrust for the engine for the conditions. In one disclosed embodiment, at takeoff power, the T3 temperature exceeds about 1560° R (Rankin), which is approximate 1100° F. In one disclosed example, the T3 temperature is between about 1000° F. and about 1500° F. In other disclosed embodiment, the T3 temperature is above about 1100° F. and up to about 1450° F.

The configuration of the example disclosed geared turbofan engine includes a bypass ratio of greater than about 10 and a gear ratio between the fan and the fan-drive turbine that is greater than about 2.4. In this example the fan drive turbine is the low pressure turbine 46; however other fan drive turbine configurations are within the contemplation of this disclosure. Operating conditions for three different engines having ratios greater than 2.4 are shown in FIG. 3. The example geared turbofan engine's compressor section 24 is capable of operating efficiently at these conditions.

The example geared turbofan engine's compressor section 24 includes at least two separately rotating sections that rotate at two different rotational speeds and the fan drive turbine 46 drives the fan 42 through the geared architecture 48 at a reduced speed. The fan drive turbine 46 may also drive both the fan 42 and the forward or low pressure compressor 44 through the geared architecture 48 at a reduced speed with the low pressure compressor 44 driven by a hub of the low speed shaft 40.

Figure 6:
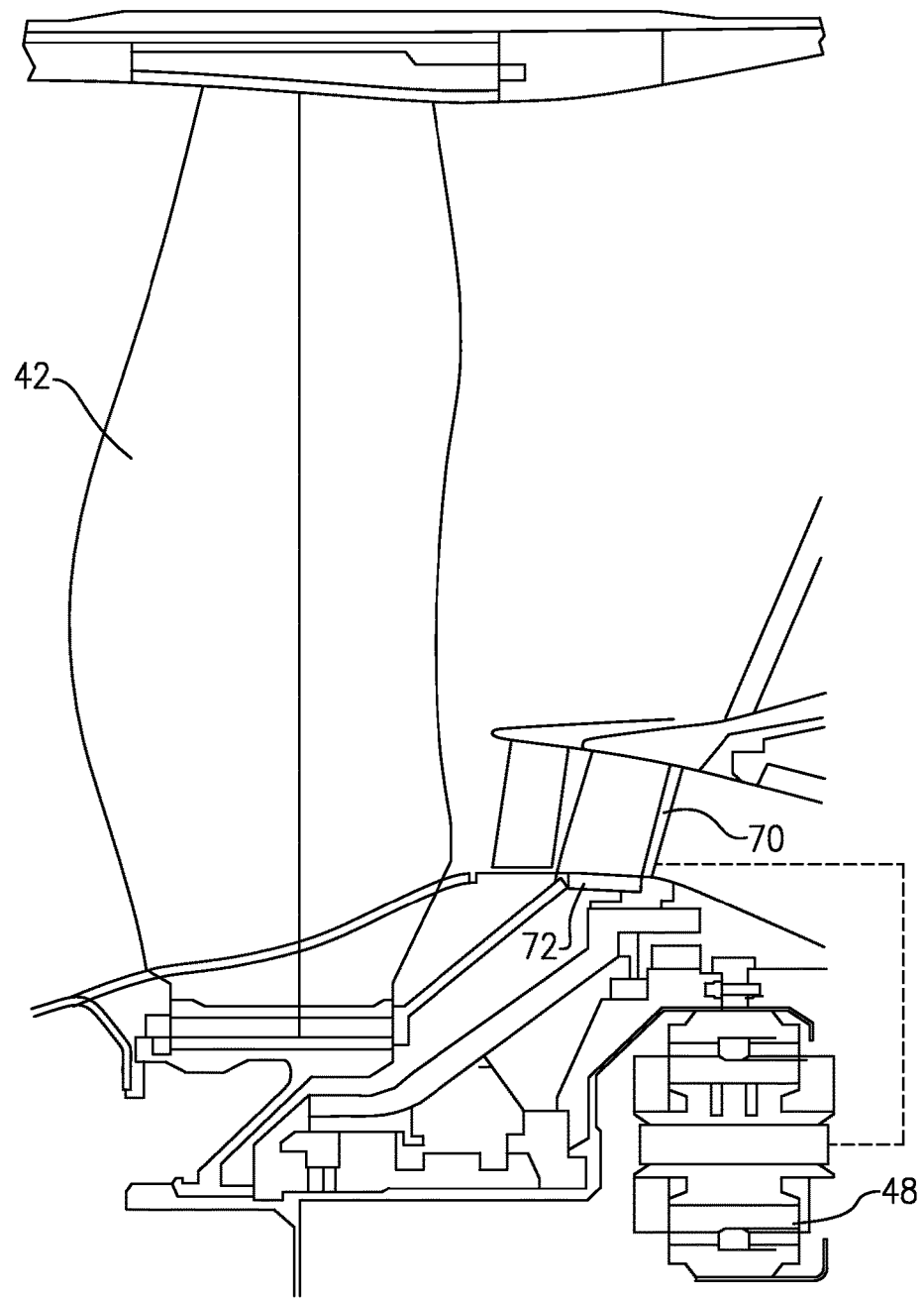
FIG. 6 is a schematic representation of a compressor section with an inducer.

In another disclosed configuration, the geared turbofan engine may include an inducer 70 (shown schematically in FIG. 6), which is an additional, third compression section in front of the other two sections of the compressor. In one example, the inducer 70 comprises a blade that can be a slotted blade or a blisk, which comes off of a hub 72 that is coupled to rotate with the fan 42. Optionally, the inducer 70 may be configured to rotate at a different higher speed through an additional output of the fan drive gearbox 48 as schematically indicated by the dashed line.

Figure 5:
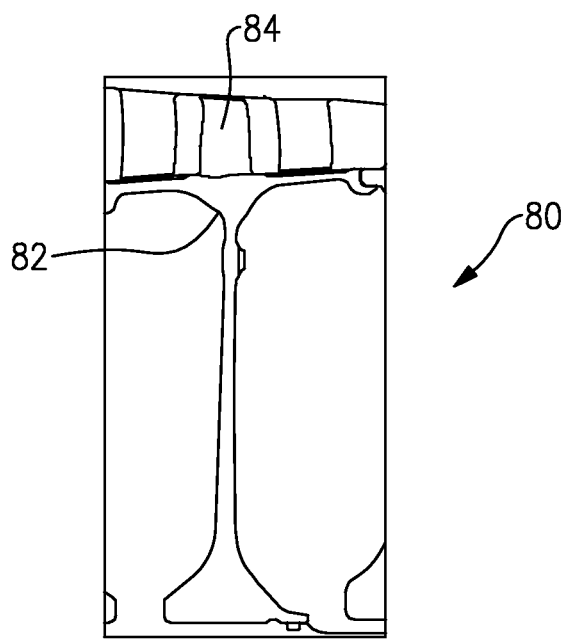
FIG. 5 illustrates a blisk without rim cavities.

The second or rear compressor of the compressor section (the high pressure compressor 52 in this disclosed example) has bladed disks 80 (also referred to in the industry as integrally bladed rotors or blisks) where a disk 82 and the associated blades 84 are machined out of the same raw material and no dovetails, slots or other fastening features are required to fix the blades 84 to the disk 82 (FIG. 5). Further, no honeycomb seals are required in the example high pressure compressor 52 and no rim cavities are present with the bladed disks 80, i.e. the rim is flush with the gaspath.

In blade and disk configurations that have rim cavities, air in the compressor is entrained into the rim cavities and this air is locally pumped up to approximately 50,000 g's in the boundary layer along the disk rim. This pumping or "windage," as is referred to in the art, yields a locally higher air temperature at the rim of the disk downstream of the first stage or cavity and further heating occurs in subsequent stages and cavities such that the next cavity is hotter than the proceeding cavity, and the next, and the next. The heating ultimately affects the last disk and stage in the compressor section 24 and limits the temperature at which the compressor can be operated because of a number of factors. Factors that limit the temperature at which the compressor can be operated include thermal mechanical fatigue, low cycle fatigue stemming from the thermal discontinuities between the rim of the disk and the disk bore, and other material and structural considerations.

As such, the subject compressor section 24 uses the bladed disks 80 at stage(s) located at the rear of the high pressure compressor 52 as indicated at 90 in FIG. 2. This eliminates local boundary layer pumping at this location.

Figure 4:
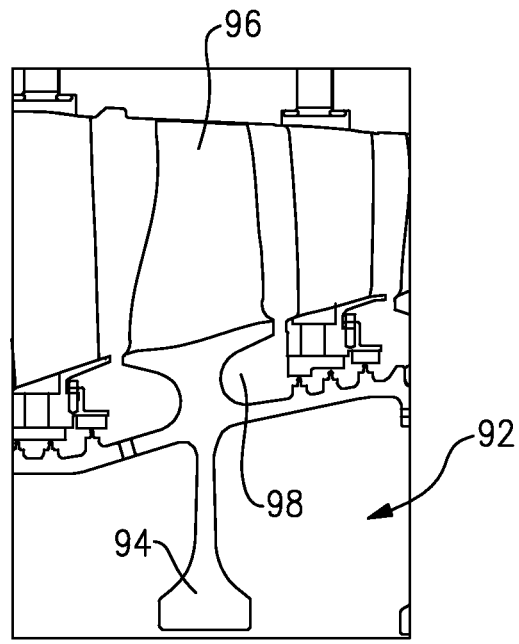
FIG. 4 illustrates a blisk with a rim cavity configuration.

A further feature of the example compressor section includes a bladed disk and seal configuration 92 that is used in stage(s) located at the front of the high pressure compressor 52 as indicated at 88 in FIG. 2. The bladed disk and seal configuration 92, shown in FIG. 4, includes a disk 94 with associated blades 96 that includes rim cavities 98 with honeycomb seals. The bladed discs 92 at this location reduce weight of both the disk rim and disk bore by reducing the amount of material turning at high speed in the rim beyond the self-sustaining radius. Further, because no attachment features are required for compressor blades, no intra-stage leakage through the attachment feature occurs.

Labyrinth or honeycomb seals are used with corresponding vanes because the example vanes have a variable angle for managing a variety of engine speeds and flight conditions. Variable vanes provide for adapting compressor operation to current operating conditions and thereby improve compressor efficiency. Moreover in one example the forward, or first compressor (in this example the forward or first compressor is the low pressure compressor 44) also includes bladed disks. Note that if the inducer 70 is utilized, then bladed disks may be utilized in the second compressor and not the forward-most compressor.

The reduction in leakage and the reduction in pumping enable the last stage of the compressor section to operate within desired temperature parameters and therefore be a practical and desirable commercially viable configuration. In this example the desired temperature range for a life typically set at 15,000 takeoff cycles or at least 7000 cycles includes the T3 temperature (HPC average exit temperature) above about 1100 F and up to 1450 deg F. at operating conditions of Sea Level, end of takeoff power, at the rated thrust for the engine at this condition.

Moreover, the disclosed compressor section includes a configuration that further enables the increased operating temperature ranges over the desired high number of takeoff cycles. The example low pressure compressor 44 and high pressure compressor 52 include an inner flow path wall and an outer flow path wall that define the successive decrease in area (indicated at 100) to compress incoming airflow (see FIG. 2). As appreciated the flow path walls are defined by platform sections of each of the stages in the corresponding compressors. The inner flow path wall is sloped progressively toward the outer flow path wall. The outer flow path wall is generally of a uniform diameter and slopes little if at all. The limited slope and curvature of the outer flow path wall provides a configuration that limits leakage due to bending and thermal changes in compressor airfoils. Bending or thermal changes in airfoils with the limited changes to the outer flow path wall result in significantly little leakage and therefore enable improved efficiency and operation at the increased operational levels.

Figure 7:
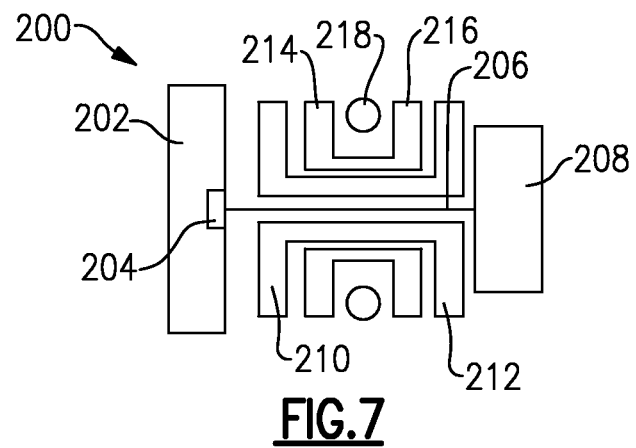
FIG. 7 shows another embodiment.

FIG. 7 shows an embodiment 200, wherein there is a fan drive turbine 208 driving a shaft 206 to in turn drive a fan rotor 202. A gear reduction 204 may be positioned between the fan drive turbine 208 and the fan rotor 202. This gear reduction 204 may be structured and operate like the gear reduction disclosed above. A compressor rotor 210 is driven by an intermediate pressure turbine 212, and a second stage compressor rotor 214 is driven by a turbine rotor 216. A combustion section 218 is positioned intermediate the compressor rotor 214 and the turbine section 216.

Figure 8:
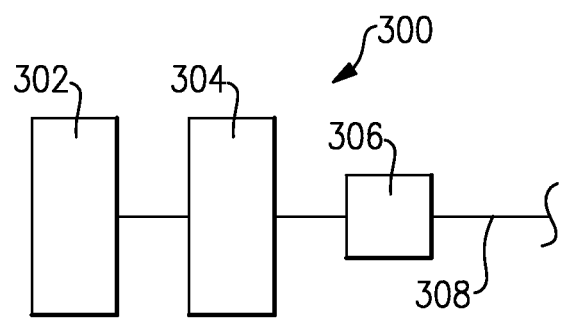
FIG. 8 shows yet another embodiment.

FIG. 8 shows yet another embodiment 300 wherein a fan rotor 302 and a first stage compressor 304 rotate at a common speed. The gear reduction 306 (which may be structured as disclosed above) is intermediate the compressor rotor 304 and a shaft 308 which is driven by a low pressure turbine section.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gas turbine engine comprising:
a fan including a plurality of fan blades rotatable about an axis;
a compressor section including at least a first compressor section and a second compressor section, and wherein the first compressor section comprises a low pressure compressor and the second compressor section comprises a high pressure compressor, and wherein components of the second compressor section are configured to operate at an average exit temperature that is between 1000° F. and 1500° F., and wherein the fan is configured to operate at a redline speed of at least 3200 rpm at the average exit temperature;
a combustor in fluid communication with the compressor section;
a turbine section in fluid communication with the combustor, wherein the turbine section comprises a low pressure turbine that drives the low pressure compressor via a first shaft and a high pressure turbine that drives the high pressure compressor via a second shaft;
a geared architecture driven by the turbine section for rotating the fan about the axis, and wherein the geared architecture couples the first shaft to the fan; and
an inducer forming an additional compression section positioned in front of the high and low pressure compressors.

2. The gas turbine engine according to claim 1 wherein the average exit temperature is between 1100° F. and 1450° F.

3. The gas turbine engine according to claim 1 wherein the fan drives air along a bypass flow path in a bypass duct defined between a fan nacelle and a core nacelle, and wherein a bypass ratio is greater than ten.

4. The gas turbine engine according to claim 1 wherein the geared architecture has a gear ratio that is greater than 2.4.

5. The gas turbine engine according to claim 1 wherein the high pressure compressor includes a plurality of stages with each stage comprising a disk with a plurality of blades extending radially outwardly from a rim of the disk, and wherein the plurality of stages includes at least a first stage having a first blade and disk configuration and a second stage having a second blade and disk configuration that is different than the first blade and disk configuration.

6. The gas turbine engine according to claim 1 wherein the inducer is configured to rotate at a speed common with that of the fan.

7. The gas turbine engine as set forth in claim 1, wherein the geared architecture is positioned intermediate the fan and a compressor rotor driven by the low pressure turbine.

8. The gas turbine engine according to claim 1 wherein the first compressor section is configured to rotate at a redline speed of at least 10,000 rpm and the second compressor section is configured to rotate at a redline speed of at least 22,000 rpm at the average exit temperature.

9. The gas turbine engine as set forth in claim 1 wherein the average exit temperature is defined at Sea Level, end of takeoff power and at a rated thrust for the gas turbine engine.

10. A gas turbine engine comprising:
a fan including a plurality of fan blades rotatable about an axis;
a compressor section including at least a first compressor section and a second compressor section, and wherein the first compressor section comprises a low pressure compressor and the second compressor section comprises a high pressure compressor, and wherein components of the second compressor section are configured to operate at an average exit temperature that is between 1000° F. and 1500° F.;
the high pressure compressor including a plurality of stages with each stage comprising a disk with a plurality of stages includes at least a first stage having a first blade and disk configuration and the plurality of stages includes at least a first stage having a first blade and disk configuration and a second stage having a second blade and disk configuration that is different than the first blade and disk configuration, and wherein the first blade and disk configuration comprises a plurality of slots to receive the plurality of blades and including a plurality of rim cavities for honeycomb seals, and wherein the second blade and disk configuration comprises integrally formed blades such that there are no rim cavities or associated honeycomb seals;

a combustor in fluid communication with the compressor section;

a turbine section in fluid communication with the combustor, wherein the turbine section comprises a low pressure turbine that drives the low pressure compressor via a first shaft and a high pressure turbine that drives the high pressure compressor via a second shaft;

a geared architecture driven by the turbine section for rotating the fan about the axis, and wherein the geared architecture couples the first shaft to the fan; and an inducer forming an additional compression section positioned in front of the high and low pressure compressors.

11. The gas turbine engine according to claim 10 wherein the first stage is positioned forward of the second stage.

12. A gas turbine engine comprising:
a fan including a plurality of fan blades rotatable about an axis;
a compressor section including at least a first compressor section and a second compressor section, and wherein the first compressor section comprises a low pressure compressor and the second compressor section comprises a high pressure compressor, and wherein components of the second compressor section are configured to operate at an average exit temperature that is between 1000° F. and 1500° F.;
a combustor in fluid communication with the compressor section;
a turbine section in fluid communication with the combustor, wherein the turbine section comprises a low pressure turbine that drives the low pressure compressor via a first shaft and a high pressure turbine that drives the high pressure compressor via a second shaft;
a geared architecture driven by the turbine section for rotating the fan about the axis, and wherein the geared architecture couples the first shaft to the fan; and
an inducer forming an additional compression section positioned in front of the high and low pressure compressors, and wherein the inducer is configured to rotate at a higher speed than the fan through an additional output of the geared architecture.

13. A gas turbine engine comprising:
a fan including a plurality of fan blades rotatable about an axis;
a compressor section including at least a first compressor section and a second compressor section, and wherein the first compressor section comprises a low pressure compressor and the second compressor section comprises a high pressure compressor, and wherein components of the second compressor section are configured to operate at an average exit temperature that is between 1000° F. and 1500° F.;
a combustor in fluid communication with the compressor section;
a turbine section in fluid communication with the combustor, wherein the turbine section comprises a low pressure turbine that drives the low pressure compressor via a first shaft and a high pressure turbine that drives the high pressure compressor via a second shaft;
a geared architecture driven by the turbine section for rotating the fan about the axis, and wherein the geared architecture couples the first shaft to the fan; and
an inducer forming an additional compression section positioned in front of the high and low pressure compressors; and
an intermediate pressure turbine section that drives a compressor rotor.

14. A gas turbine engine comprising:
a fan including a plurality of fan blades rotatable about an axis;
a compressor section including at least a first compressor section and a second compressor section, and wherein the first compressor section comprises a low pressure compressor and the second compressor section comprises a high pressure compressor, and wherein components of the second compressor section are configured to operate at an average exit temperature that is between 1000° F. and 1500° F.;
a combustor in fluid communication with the compressor section;
a turbine section in fluid communication with the combustor, wherein the turbine section comprises a low pressure turbine that drives the low pressure compressor via a first shaft and a high pressure turbine that drives the high pressure compressor via a second shaft;
a geared architecture driven by the turbine section for rotating the fan about the axis, and wherein the geared architecture couples the first shaft to the fan; and
an inducer forming an additional compression section positioned in front of the high and low pressure compressors, and wherein the geared architecture is positioned upstream of the low pressure turbine and downstream of a compressor rotor driven by the low pressure turbine.

15. A gas turbine engine comprising:
a fan including a plurality of fan blades rotatable about an axis;
a compressor section including at least a first compressor section and a second compressor section, and wherein the first compressor section comprises a low pressure compressor and the second compressor section comprises a high pressure compressor, and wherein components of the second compressor section are configured to operate at an average exit temperature that is between 1000° F. and 1500° F.;
a combustor in fluid communication with the compressor section;
a turbine section in fluid communication with the combustor, wherein the turbine section comprises a low pressure turbine that drives the low pressure compressor via a first shaft and a high pressure turbine that drives the high pressure compressor via a second shaft;
a geared architecture driven by the turbine section for rotating the fan about the axis, and wherein the geared architecture couples the first shaft to the fan; and
an inducer forming an additional compression section positioned in front of the high and low pressure compressors, and wherein the turbine section includes a fan drive turbine that is coupled to drive the geared architecture, an intermediate pressure turbine configured to drive a first compressor rotor, and a turbine rotor configured to drive a second compressor rotor.

* * * * *

UNITED STATES PATENT AND TRADEMARK OFFICE
CERTIFICATE OF CORRECTION

Page 1 of 1

PATENT NO. : 10,036,316 B2
APPLICATION NO. : 14/663727
DATED : July 31, 2018
INVENTOR(S) : Frederick M. Schwarz and Karl L. Hasel It is certified that error appears in the above-identified patent and that said Letters Patent is hereby corrected as shown below:

In the Claims

In Claims 2-6, 8-9, and 11; add a --,-- after the claim number

In Claim 10, Column 8, Line 64; replace "with a plurality" with --with a plurality of blades extending radially outwardly from a rim of the disk, and wherein the plurality--

In Claim 10, Column 8, Line 66-67 to Column 9, Line 1; delete "and the plurality of stages includes at least a first stage having a first blade and disk configuration"

In Claim 13, Column 10, Line 6; replace "to the fan; and" with --to the fan;--

Signed and Sealed this
Twenty-fifth Day of January, 2022

Drew Hirshfeld
*Performing the Functions and Duties of the*
*Under Secretary of Commerce for Intellectual Property and*
*Director of the United States Patent and Trademark Office*